United States Patent Office 2,790,812
Patented Apr. 30, 1957

2,790,812

ORGANIC MERCURY COMPOUNDS

Lincoln H. Werner, Summit, N. J., and Caesar R. Scholz, Basel, Switzerland, assignors to Ciba Pharmaceutical Products, Inc., Summit, N. J.

No Drawing. Application June 10, 1953, Serial No. 360,812

6 Claims. (Cl. 260—340.6)

This invention relates to organic mercury compounds.

It is a primary object of this invention to provide a new type of organic mercury compounds corresponding to the structure

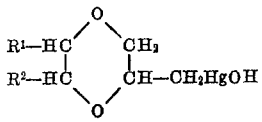

wherein $R^1$ and $R^2$ stand for hydrogen,

—$(CHOH)_nCH_2OH$ or —$(CHOH)_nCHO$ and $n$ is a whole number from 0 to 4. The invention extends also to salts of the said compounds with acids and to compounds wherein the aliphatic hydroxyls in the $R^1$ and $R^2$ moities are esterified or protected by acetal or ketal groups.

The thus described compounds of this invention are produced conveniently by mercurating the monoallyl ether of a polyol compound. The mercuration reaction is carried out with the aid of a mercuric salt such as mercuric acetate, mercuric benzoate, or mercuric tartrate in a suitable solvent, mercuric nitrate or mercuric chloride in a suitable solvent with occasional additions of alkali to maintain a slight turbidity caused by precipitation of mercuric oxide; or with the aid of mercuric oxide in a suitable solvent containing one equivalent of an acid such as acetic, benzoic, tartaric, citric and the like. The reaction product is recovered from the reaction mixture by precipitation or by evaporating the solution to dryness, or by drying from the frozen state.

Suitable polyol compounds from which the allyl ethers are derived are selected, for example, from carbohydrates, more particularly the aldoses, ketoses, the alcohols formed by reduction of the carbonyl group present in aldoses and ketoses, and derivatives of such wherein the hydroxyl radicals are protected by ester, acetal or ketal groups and the like. Examples of suitable allyl-polyol ethers are allyl ethers derived from ethylene glycol, glycerol, glucose, xylitol, mannitol, sorbitol and the like or ester, acetal, or ketal derivatives of such wherein a free hydroxyl is present on the carbon atom adjacent to the carbon atom bearing the ether linkage such as, for example, the 3-allyl ether of 1,2;5,6-diacetone mannitol and the like.

Examples of suitable solvents in which to carry out the mercuration step are dioxane, ethylene glycol dimethyl ether, acetone, aqueous mixtures with such compounds, water and the like. In general, the solvent chosen will be one in which the allyl-polyol ether is soluble.

The products of the present invention have utility as germicides, and as diuretics and are especially useful as the starting point for the preparation of a number of other organic mercurials which are especially useful as diuretics.

In the following examples the invention is illustrated in greater detail with reference to exemplary representative embodiments thereof. It is to be understood, however, that these examples are presented solely by way of illustration and not by way of limitation. In the examples, parts by weight bear the same relation to parts by volume as do grams to milliliters. Temperatures are expressed in degrees centigrade.

Example 1

To 2.2 parts by weight of the monoallyl ether of ethylene glycol, 6.36 parts by weight of mercuric acetate dissolved in 15 parts by volume of water are added. The reaction mixture is allowed to stand at room temperature for 16–24 hours, the solution is tested for the presence of free mercury ion by making alkaline and if no turbidity due to mercuric oxide appears, the solution is then evaporated to dryness. The product is dissolved in anhydrous ethanol, and the solution filtered and evaporated to dryness again. 2-acetoxymercurimethyl-p-dioxane is thus obtained as a colorless, highly viscous oil corresponding to the formula

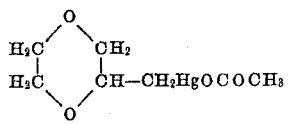

If instead of evaporating the reaction mixture to dryness, it is neutralized with 2 N sodium hydroxide and a solution of 3.32 parts by weight of potassium iodide dissolved in 4 parts by volume of water added, a precipitate forms which crystallizes and melts after recrystallization from methanol at 78°. The product thus obtained is 2-iodomercurimethyl-p-dioxane corresponding to the formula

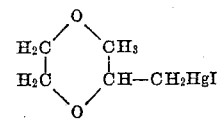

Example 2

6.6 parts by weight of allyl-2,3-dihydroxypropyl ether are dissolved in 10 parts by volume of water, and a solution of 15.9 parts by weight of mercuric acetate in 35 parts by volume of water is added. The reaction mixture is allowed to stand overnight, a sample tested for free mercury ion by making alkaline and, in the absence of excess free mercury ion, the reaction mixture evaporated to dryness. The product is dissolved in anhydrous ethanol, the solution filtered and then evaporated to dryness again. 6-acetoxymercurimethyl-2-p-dioxane methanol is thus obtained as a colorless, highly viscous oil corresponding to the formula

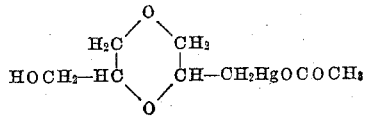

The reaction product can be converted to a crystalline derivative by treating 5.9 parts by weight of 6-acetoxymercurimethyl-2-p-dioxane methanol with 6 parts by volumn of acetic anhydride and 12 parts by volume of pyridine at room temperature. After 16 hours, the reaction mixture is concentrated in vacuo, the residue taken up in chloroform, washed with water and the acetylated product isolated by removal of the solvent. 7.38 parts by weight of the acetylated product are dissolved in 5 parts by volume of methanol and a solution of 3 parts by weight of potassium iodide and 3 parts by volume of water added. An oil separates which is taken up in chloroform, washed with water, dried and isolated by removing the chloroform. The residue is recrystallized from an ethyl acetate-hexane mixture and melts at 71–72°. The product thus obtained is 6-iodomercurimethyl-2-p-dioxane methanol acetate corresponding to the formula

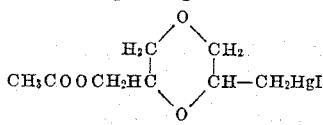

Example 3

20 parts by weight of diacetone xylitol are dissolved in 20 parts by volume of water and 85 part by volume of acetone. The resultant solution is made alkaline with 32 parts by weight of sodium hydroxide in 32 parts by volume of water, and to the thus-obtained solution are added 16.6 parts by weight of allyl bromide dissolved in 25 parts by volume of acetone. The allyl bromide solution is added dropwise with stirring over a period of 3 hours at 75°. The acetone is then removed by distillation, the residue diluted with 200 parts by volume of water, and the aqueous solution neutralized partially with 16 parts by vloume of concentrated sulfuric acid in 50 parts by volume of water. The resulting solution is extracted four times with ether, each time with 100 parts by volume, the combined extracts dried over anhydrous potassium carbonate and then evaporated to dryness. The residue is distilled under reduced pressure, boiling at 94–96° at 0.05 mm. pressure.

7.1 parts by weight of the thus-obtained 3-allyl-diacetone xylitol are dissolved in 50 parts by volume of water containing 1.5 parts by volume of concentrated sulfuric acid, and the solution refluxed for 3 hours. The solution is then cooled, neutralized with 20 parts by weight of barium carbonate, the barium salts removed by filtration, the filtrate extracted with ether to remove impurities and then evaporated to dryness. 3-Allyl xylitol is thus obtained as a syrup.

4.3 parts by weight of syrupy 3-allyl xylitol are dissolved in 5 parts by volume of water, and a solution of 7.2 parts by weight of mercuric acetate in 25 parts by volume of water is added. The last portions of the mercuric acetate solution are added cautiously, with testing for free mercuric ion after each addition. The addition is stopped short of excess of free mercuric ion. The reaction mixture is allowed to stand for 36 hours, filtered and evaporated to dryness. The product, 1-[5-acetoxymercurimethyl)-3-(hydroxymethyl)-2-p-dioxanyl] - 1,2 - ethanediol, is obtained as a syrup corresponding to the formula

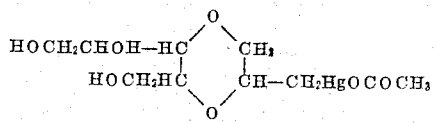

Example 4

22.6 parts by weight of diacetone glucose are dissolved in 20 parts by volume of water and 85 parts by volume of acetone. A solution of 32 parts by weight of sodium hydroxide and 32 parts by volume of water is added, followed by 15.1 parts by weight of allyl bromide in 20 parts by volume of acetone, the addition of the allyl bromide solution being extended over a period of 3 hours and at 75° while stirring. The acetone is then removed by distillation, the residue diluted with 250 parts by volume of water, and the aqueous solution neutralized partially with 16.2 parts by volume of concentrated sulfuric acid in 50 parts by volume of water. The resulting solution is extracted four times with ether, each time with 100 parts by volume. The combined extracts are dried over anhydrous potassium carbonate and evaporated to dryness to give a syrupy residue of 3-allyl-1,2;5,6-diacetone glucose.

26.18 parts by weight of the 3-allyl-1,2;5,6-diacetone glucose are refluxed for 4 hours with 100 parts by volume of water containing 4 parts by volume of concentrated sulfuric acid. The solution is then cooled, neutralized with 40 parts by weight of barium carbonate, the barium salts removed by filtration, the filtrate extracted with ether to remove impurities and then evaporated to dryness. The residue is dissolved in alcohol and the alcohol solution evaporated to dryness. On addition of ethyl acetate the residue crystallizes and is recrystallized from ethanol to yield 3-allyl glucose; melting point 133–136°.

3.6 parts by weight of the 3-allyl glucose are dissolved in 6 parts by volume of water, and a solution of 5.2 parts by weight of mercuric acetate in 15 parts by volume of water added. After standing overnight, the solution is evaporated to dryness and the residue dried in vacuo to an amorphous hygroscopic solid. The exact structure of the product is unknown but, it is believed to be cyclic in nature, the dioxane ring involving either positions 2 and 3 or positions 3 and 4 of the glucose chain. The corresopnding formulae may be written as

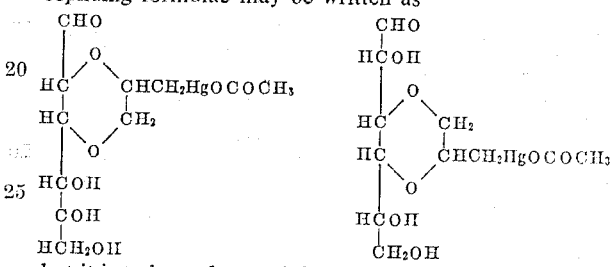

but it is to be understood that glucose may be represented by pyranose and furanose formulae.

Example 5

9.4 parts by weight of 6-allyl sorbitol are dissolved in 10 parts by volume of water, and a solution of 13.45 parts by weight of mercuric acetate in 40 parts by volume of water added. After standing overnight, the solution is filtered, evaporated to dryness and the product, 1-(6-acetoxymercurimethyl-2-p-dioxanyl)-1,2,3,4-butane-tetrol, thus obtained as a syrupy residue, is dried under reduced pressure. It corresponds to the formula

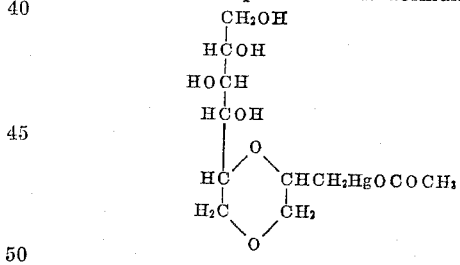

Example 6

4.45 parts by weight of 3-allyl mannitol are dissolved in 10 parts by volume of water. 6.35 parts by weight of mercuric acetate are dissolved in 20 parts by volume of water to which two drops of acetic acid are added, and the resulting solution is allowed to stand at room temperature (20–40°) for 16 hours. The reaction mixture is evaporated to dryness and the product obtained as a syrup, which is dried under reduced pressure. The reaction product is predominantly 5-acetoxymercurimethyl-p-dioxane-2,3-bis-(ethanediol) corresponding to the formula

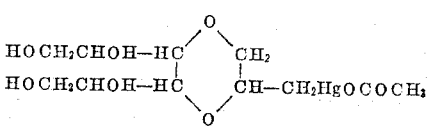

together with a minor proportion of the other isomer, 5 - acetoxymercurimethyl - 2-hydroxymethyl-p-dioxane-3-(1,2,3-trihydroxypropane) corresponding to the formula

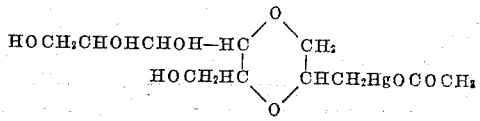

Example 7

90.6 parts by weight of 3-allyl diacetone mannitol is dissolved in 750 parts by volume of dioxane. 95.4 parts by weight of mercuri acetate is added and the mixture stirred at 60° for 5 hours and at room temperature for 16 hours. The reaction mixture is filtered and the filtrate evaporated to dryness. The product crystallizes on treatment with hexane and ethyl acetate; it is filtered off and recrystallized from ethyl acetate—hexane yielding the mercurated product melting at 103–106° and having the structure

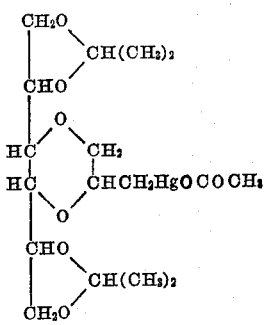

$[\alpha]_D = +32.9°$ (C=2% in ethanol).

16.5 parts by weight of mecurated diacetone allyl mannitol is dissolved in 200 parts by volume of 50% by volume acetic acid. The solution is heated at 65° for 1 hour, then evaporated to dryness in vacuo to yield the mercurated product having the structure

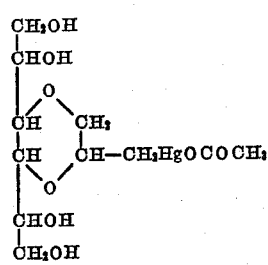

Example 8

0.55 part by weight of 3-allyl mannitol is dissolved in 10 parts by volume of water, and 1.1 parts by weight of mercuric benzoate and 20 parts by volume of ether added. On shaking, the mercuric benzoate slowly dissolves. When all the mercuric benzoate has dissolved, the ether layer—which contains the liberated benzoic acid—is separated and the aqueous solution which remains is concentrated in vacuo. The product is precipitated by adding acetone. It is washed with acetone and dried in vacuo to an amorphous solid, to yield the benzoate salt corresponding to the product of Example 6.

Example 9

1.11 parts by weight of 3-allyl mannitol are dissolved in 5 parts by volume of water, to which are added 1.08 parts by weight of mercuric oxide and 0.75 part by weight of d-tartaric acid. On shaking, the mercuric oxide dissolves rapidly. The solution is filtered and concentrated in vacuo. The product is precipitated by adding acetone and is washed repeatedly with acetone and dried in vacuo to a amorphous solid which is the acid tartrate salt corresponding to the product of Example 6.

Example 10

1.11 parts by weight of 3-allyl mannitol are dissolved in 5 parts by volume of water, to which are added 1.08 parts by weight of mercuric oxide and 2.5 parts by volume of 2 N nitric acid. The reaction mixture is shaken, whereupon the mercuric oxide dissolves rapidly. The solution is filtered, concentrated in vacuo and the product precipitated by adding acetone. The precipitate is filtered off, washed repeatedly with acetone and dried in vacuo to an amorphous solid which is the nitrate salt corresponding to the product of Example 6.

This application is a continuation-in-part of our application Serial No. 248,862, filed September 28, 1951, now abondoned.

What is claimed is:

1. Organic mercuric compounds selected from the group consisting of those having the general formula:

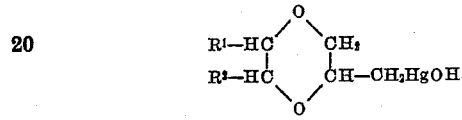

wherein $R^1$ and $R^2$ are members selected from the group consisting of hydrogen and $—(CHOH)_nCH_2OH$, $n$ being a number from 0 to 4, and the reaction product produced by reacting 3-allyl glucose with a mercuric salt in an aqueous medium and non-toxic salts thereof.

2. A compound of the formula:

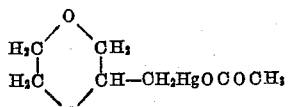

3. A compound of the formula:

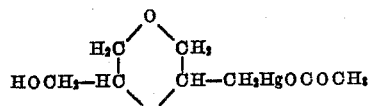

4. A compound of the formula:

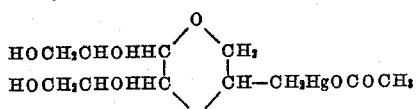

5. A compound of the formula:

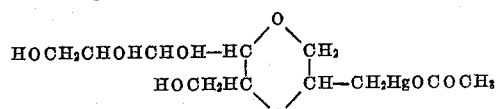

6. The reaction product produced by reacting 3-allyl glucose with a mercuric salt in aqueous medium.

References Cited in the file of this patent

UNITED STATES PATENTS 2,062,404    Dreyfus _____ Dec. 1, 1936

OTHER REFERENCES

Sand: Berichte 34, 1385–1394 (1901).

Beilstein: Hand. der Org. Chem., vol. XIX, p. 378 (1934).

Straessle: JACS, 73, pp. 504–505 (1951).